(12) United States Patent
Wehner et al.

(10) Patent No.: US 11,047,426 B2
(45) Date of Patent: Jun. 29, 2021

(54) PROPELLER SHAFT WITH CRASH FEATURE

(71) Applicant: NEAPCO INTELLECTUAL PROPERTY HOLDINGS, LLC, Farmington Hills, MI (US)

(72) Inventors: Robert J. Wehner, Livonia, MI (US); Nick Dubiel, Fenton, MI (US); Arvind Srinivasan, Troy, MI (US)

(73) Assignee: NEAPCO INTELLECTUAL PROPERTY HOLDINGS, LLC, Farmington Hills, MI (US)

( * ) Notice: Subject to any disclaimer, the term of this patent is extended or adjusted under 35 U.S.C. 154(b) by 188 days.

(21) Appl. No.: 16/212,840

(22) Filed: Dec. 7, 2018

(65) Prior Publication Data

US 2019/0178302 A1 Jun. 13, 2019

Related U.S. Application Data

(60) Provisional application No. 62/740,759, filed on Oct. 3, 2018, provisional application No. 62/596,373, filed on Dec. 8, 2017.

(51) Int. Cl.
| | |
|---|---|
| *F16D 9/06* | (2006.01) |
| *F16D 1/116* | (2006.01) |
| *F16D 3/223* | (2011.01) |
| *F16D 1/10* | (2006.01) |

(52) U.S. Cl.
CPC ............... *F16D 9/06* (2013.01); *F16D 1/116* (2013.01); *F16D 3/223* (2013.01);
(Continued)

(58) Field of Classification Search
CPC .. F16C 3/023; F16C 3/03; F16D 1/116; F16D 3/06; F16D 3/223; F16D 9/00; F16D 9/06;
(Continued)

(56) References Cited

U.S. PATENT DOCUMENTS

| | | |
|---|---|---|
| 5,981,800 A | 11/1999 | Schapira et al. |
| 6,186,697 B1 | 2/2001 | Masuda et al. |
| (Continued) | | |

FOREIGN PATENT DOCUMENTS

| | | |
|---|---|---|
| DE | 102006043044 A1 | 3/2008 |
| EP | 2105621 A1 | 9/2009 |
| JP | 4996217 B2 | 8/2012 |

*Primary Examiner* — Josh Skroupa
(74) *Attorney, Agent, or Firm* — Shumaker, Loop & Kendrick, LLP; James D. Miller

(57) ABSTRACT

A propeller shaft assembly comprises a first rotary component having a first splined portion and a first engaging surface arranged transverse to a longitudinal axis of the first rotary component and spaced from the first splined portion and a second rotary component having a second splined portion configured to engage the first splined portion. The second splined portion defines a second engaging surface arranged transverse to the longitudinal axis of the first rotary component. A shear component is disposed between the first engaging surface of the first rotary component and the second engaging surface of the second rotary component. The shear component forms a crash feature of the propeller shaft assembly configured to shear at an edge of the second engaging surface when the first shear component is compressed between the first engaging surface and the second engaging surface.

19 Claims, 6 Drawing Sheets

(52) U.S. Cl.
CPC ............... *F16D 2001/103* (2013.01); *F16D 2003/22313* (2013.01); *Y10T 403/11* (2015.01); *Y10T 403/7033* (2015.01)

(58) Field of Classification Search
CPC ............... F16D 9/08; F16D 2001/103; F16D 2003/22313; Y10S 464/904–906; Y10S 403/11; Y10S 403/7033
USPC ........ 464/30, 32, 179, 182, 904–906; 403/2, 403/359.5
See application file for complete search history.

(56) References Cited

U.S. PATENT DOCUMENTS

| | | | |
|---|---|---|---|
| 6,379,255 B1 | 4/2002 | Cermak et al. | |
| 7,320,644 B2* | 1/2008 | Wehner | F16D 3/385 |
| | | | 464/130 |
| 8,197,349 B2 | 6/2012 | Terada et al. | |
| 8,206,228 B2* | 6/2012 | Langer | F16D 3/223 |
| | | | 464/906 |
| 9,303,695 B2 | 4/2016 | Choi et al. | |
| 9,611,897 B2* | 4/2017 | Edwards | F16D 3/223 |
| 9,863,481 B2* | 1/2018 | Yun | F16C 3/03 |
| 10,240,641 B2 | 3/2019 | Akita et al. | |
| 10,527,105 B2* | 1/2020 | Luck | F16D 3/227 |
| 2005/0137020 A1* | 6/2005 | Beechie | F16C 3/03 |
| | | | 464/32 |
| 2009/0217493 A1* | 9/2009 | Greenhill | F16D 1/116 |
| | | | 24/457 |
| 2016/0084317 A1* | 3/2016 | Akita | F16C 3/023 |
| | | | 464/162 |
| 2019/0353208 A1 | 11/2019 | Dmytryszyn | |

\* cited by examiner

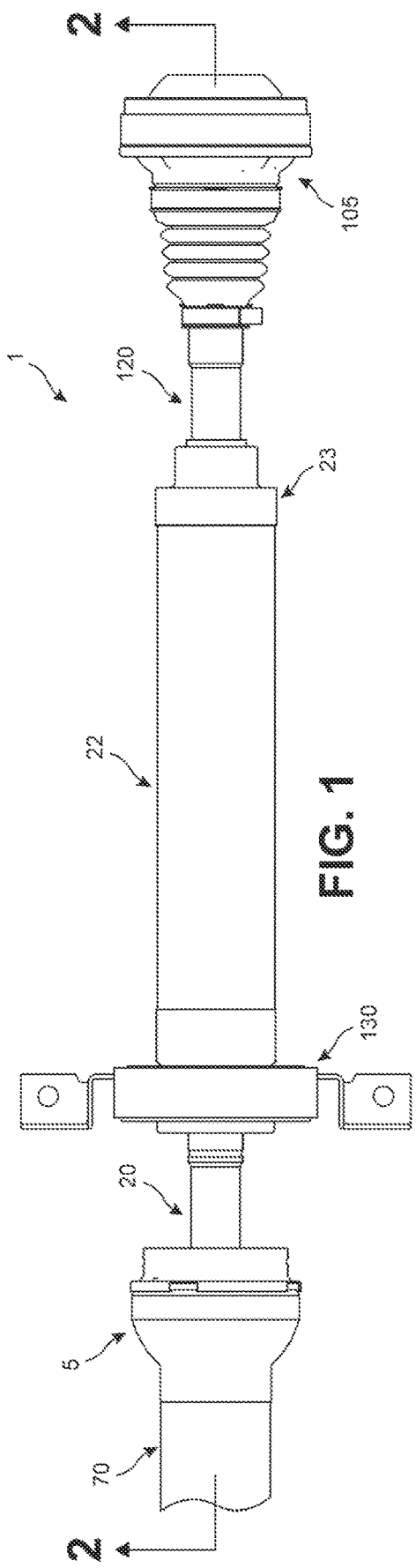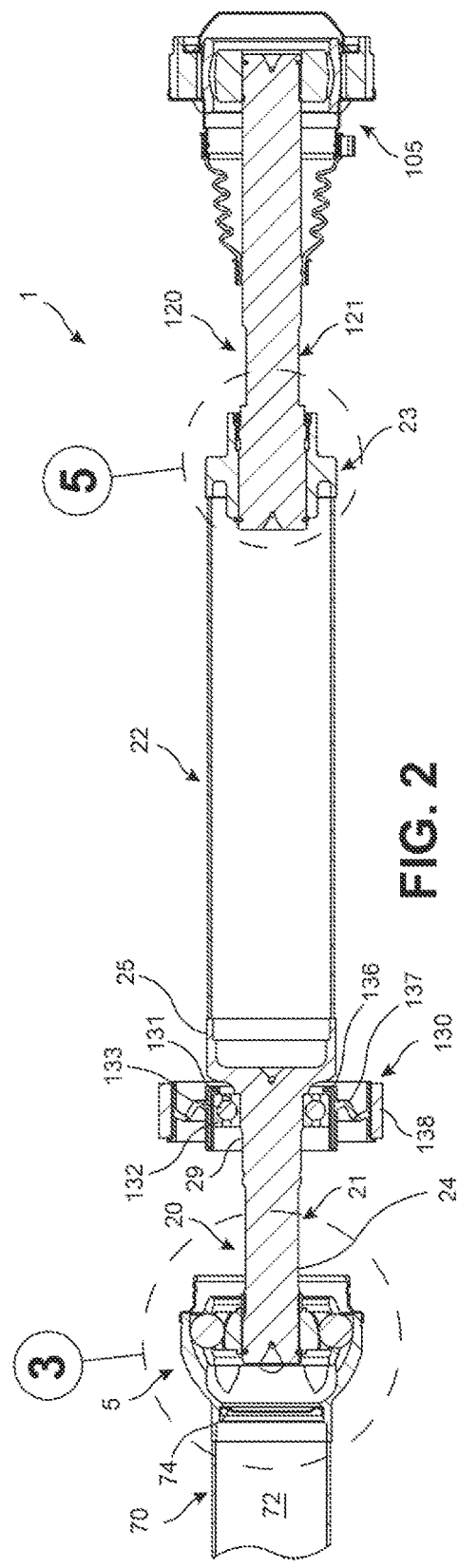

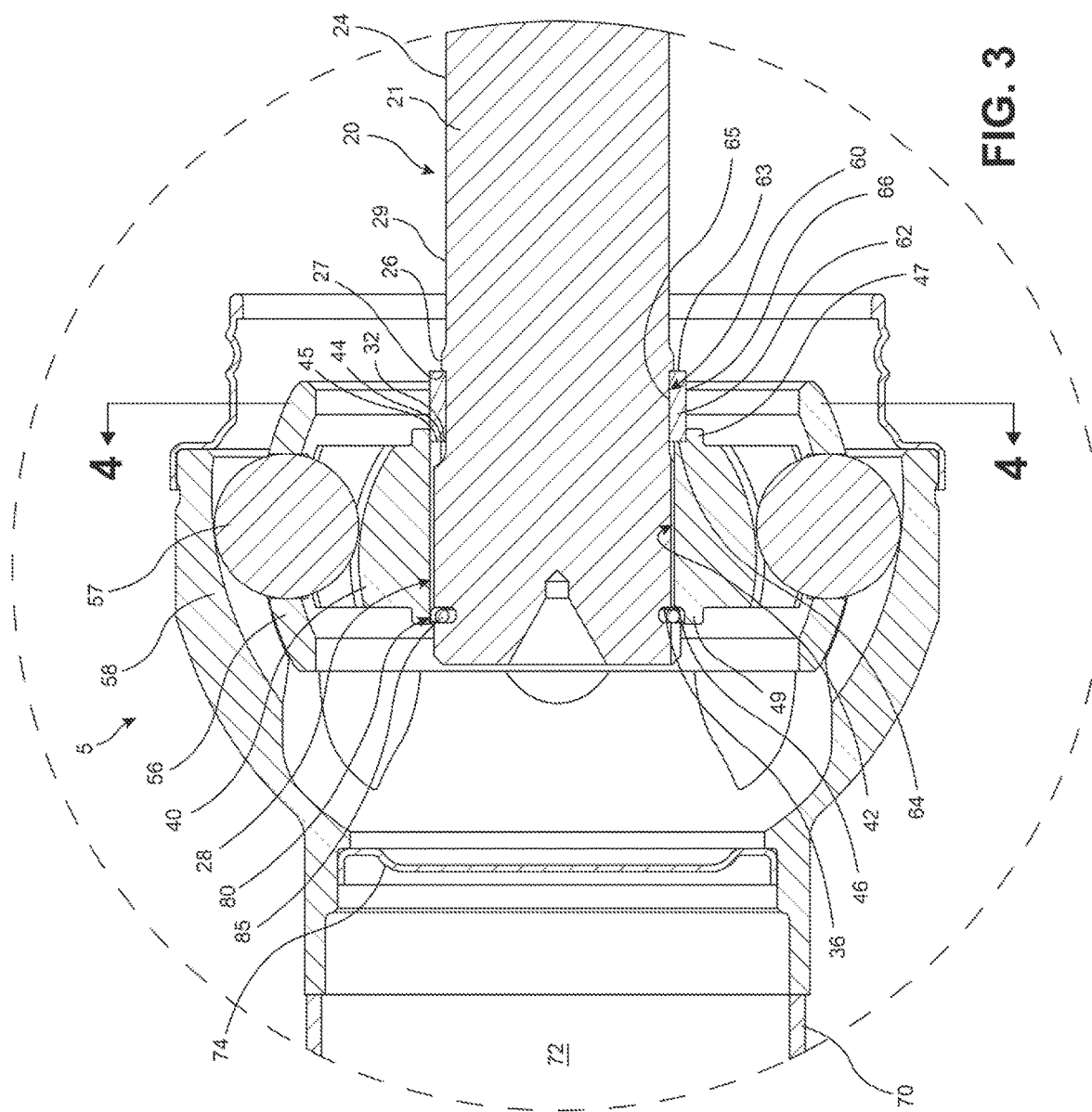

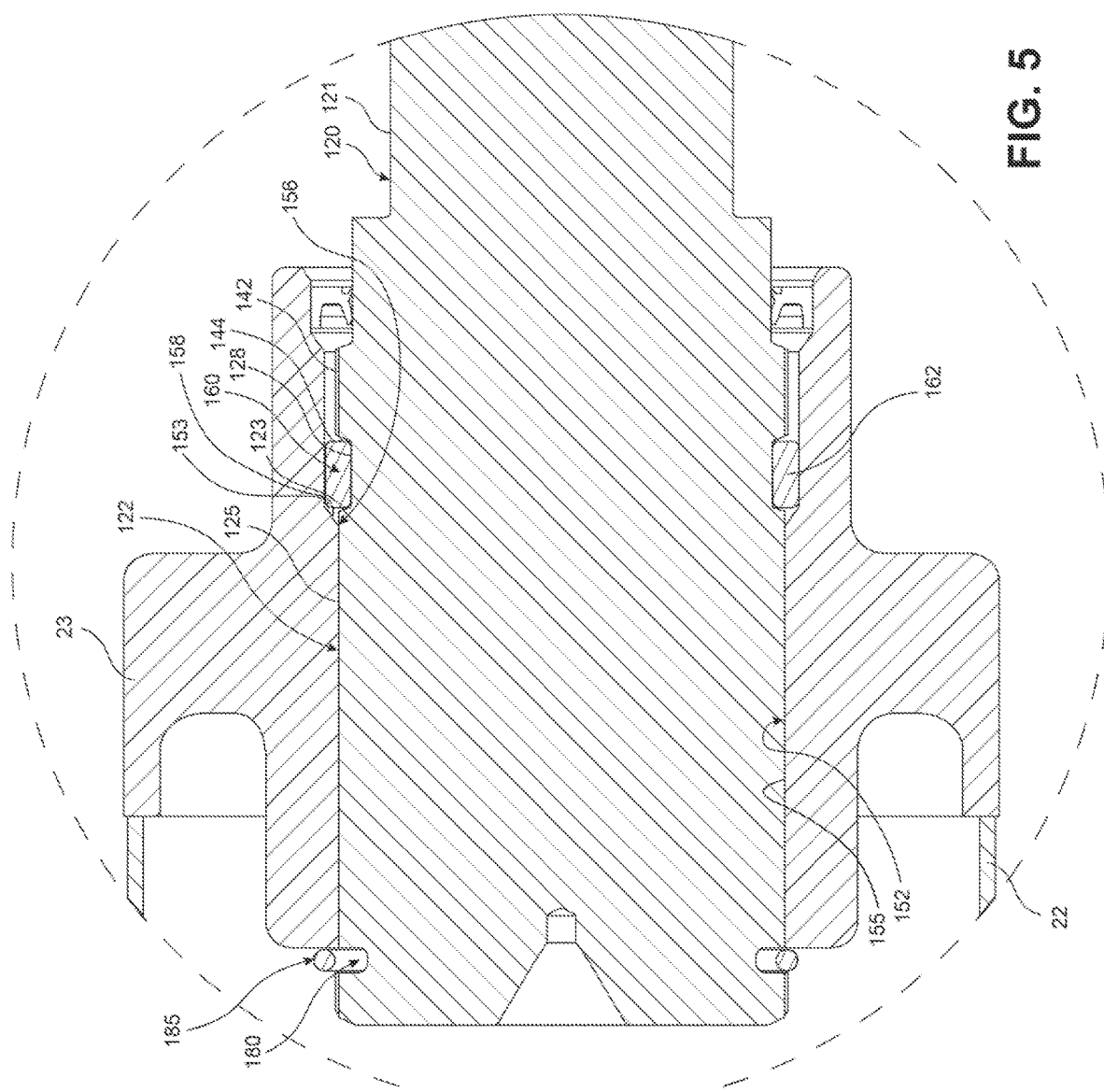

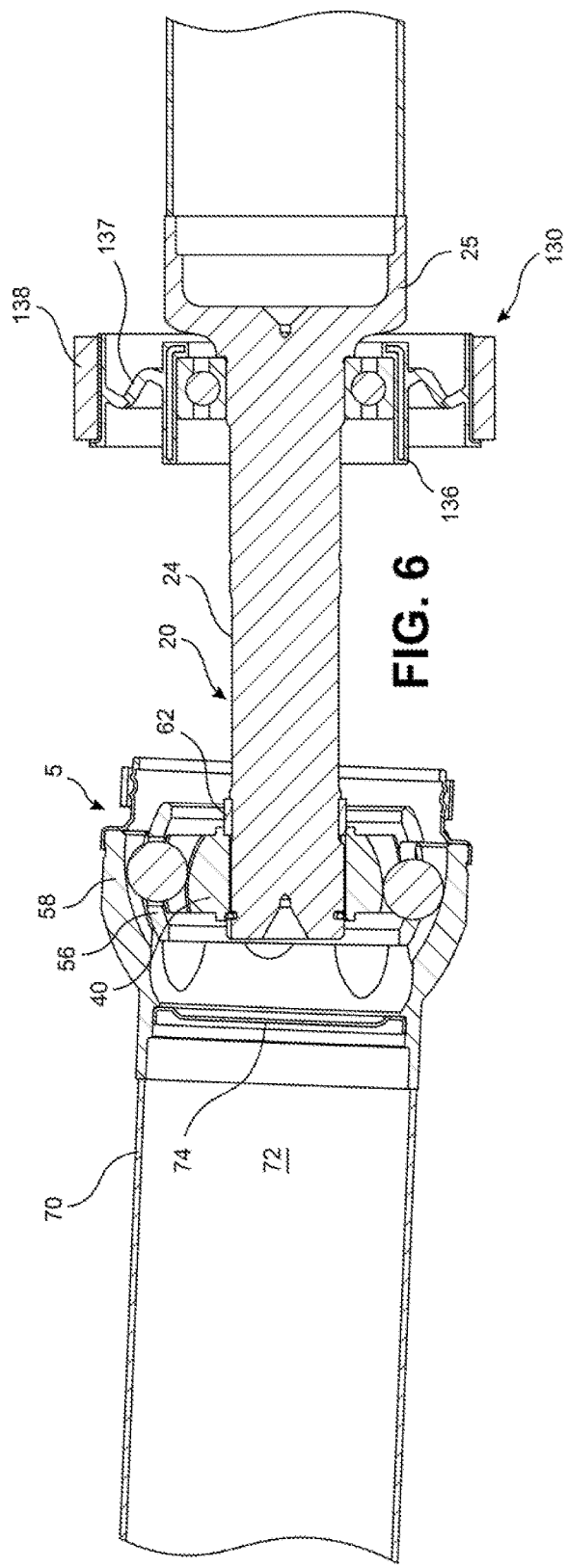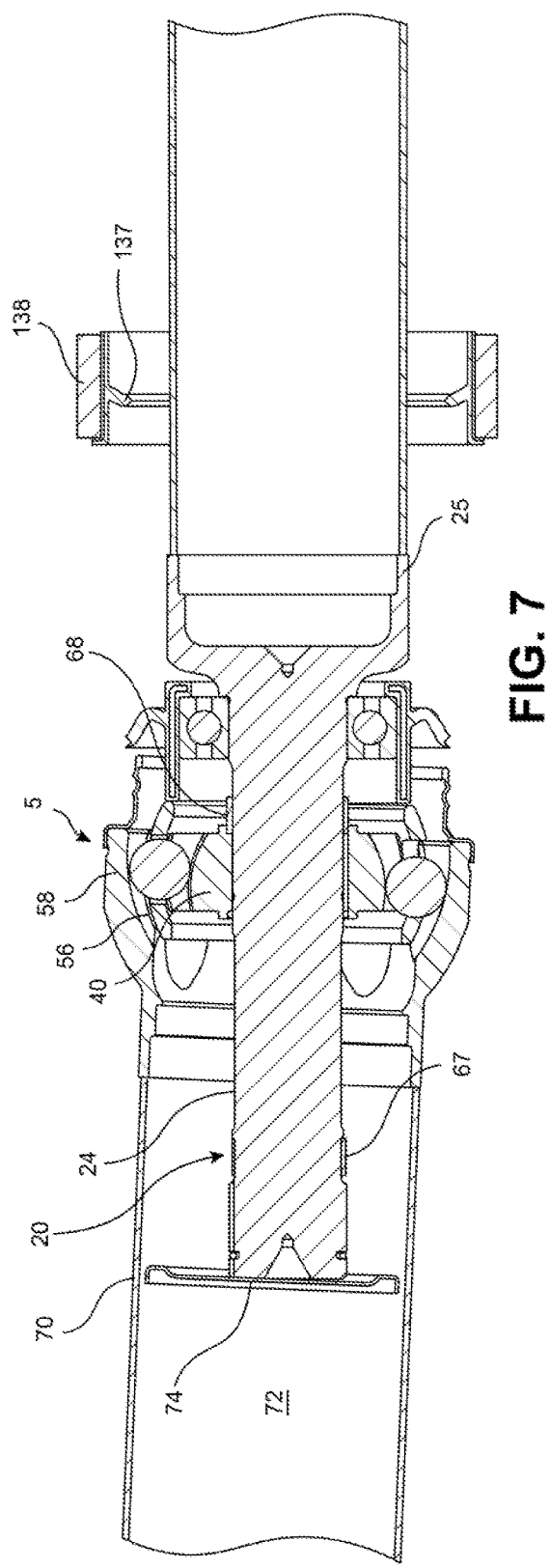

PROPELLER SHAFT WITH CRASH FEATURE

CROSS-REFERENCE TO RELATED APPLICATIONS

This patent application claims priority to U.S. Provisional Patent Application Ser. No. 62/596,373, filed on Dec. 8, 2017, and U.S. Provisional Patent Application Ser. No. 62/740,759, filed on Oct. 3, 2018, the entire disclosures of which are hereby incorporated herein by reference.

FIELD OF THE INVENTION

The invention relates to a propeller shaft assembly including a torque transferring propeller shaft coupled to and transferring rotational motion to a rotary component, wherein the propeller shaft is configured to axially telescope relative to the rotary component when the propeller shaft if subjected to a predetermined axial load.

BACKGROUND OF THE INVENTION

It is common for a drive assembly of a motor vehicle to include a multi-axial joint such as a Cardan joint or a constant velocity (CV) joint. Cardan joints and CV joints allow a propeller shaft of the drive assembly to transmit power through a variable angle during rotation of the propeller shaft without an appreciable increase in friction or play between the propeller shaft and the driven component.

Cardan joints typically include a cross member pivotally coupled to each of a first shaft portion and a second shaft portion. The first shaft portion includes a first U-shaped structure pivotally coupled to the cross member about a first axis of rotation of the cross member and the second shaft portion includes a second U-shaped structure pivotally coupled to the cross member about a second axis of rotation of the cross member arranged perpendicular to the first axis of rotation. The rotational motion of one of the shaft portions is transferred to the other of shaft portions via the dual pivoting of the cross member relative to the first and second axes of rotation, wherein one of the first shaft portion or the second shaft portion may represent the propeller shaft of the corresponding drive assembly.

CV joints typically include an outer race having an inner surface with ball tracks, an inner race having an outer surface with ball tracks corresponding to the ball tracks of the outer race, and a ball cage disposed between the outer race and the inner race and having a plurality of apertures formed therein. A plurality of balls is received in the apertures of the ball cage and the ball tracks of each of the inner race and the outer race to allow for relative motion between the inner race and the outer race of the constant velocity joint during rotation of the propeller shaft. The inner race of the CV joint may be coupled to and driven by the torque transferring propeller shaft, wherein the torque transferred to the inner race by the propeller shaft is subsequently transferred to the outer race via a rolling of the plurality of the balls between the inner race and the outer race.

Vehicle crashes or collisions may induce axial compressive forces on the propeller shaft in a manner causing the propeller shaft to buckle or fracture in an uncontrolled manner. One solution to this problem includes configuring the components of the propeller shaft to buckle or fracture in a controlled manner that includes a telescoping of at least one of the components relative to another of the components to reduce the axial length of the propeller shaft. For example, U.S. Pat. No. 6,379,255 discloses a propeller shaft having a feature for allowing the propeller shaft to reduce its length in the axial direction when exposed to an axial load during a crash of the vehicle. The propeller shaft includes the inner race of a constant velocity joint telescoping into a cylindrical propeller shaft tube, wherein the propeller shaft tube is formed to a side of the inner race opposite a torque transferring shaft coupled to and driving the inner race.

Alternatively, U.S. Pat. No. 8,197,349 discloses a propeller shaft wherein the torque transferring shaft coupled to the inner race of a constant velocity joint is allowed to break away from the inner race and telescope into the propeller shaft tube in response to an axial load condition. However, this propeller shaft configuration requires the use of two components in the form of a stop ring and a collar in order to control the axial breakaway characteristics of the propeller shaft during an axial load condition, thereby increasing the cost and complexity to manufacture the corresponding drive assembly.

Japanese patent JP4996217 discloses yet another alternative propeller shaft configuration for controlling the fracture or buckling of the propeller shaft in response to an axial crash load. However, the propeller shaft is drawn toward a plunging constant velocity joint utilizing a single snap ring for controlling the axial breakaway loading in each of the opposing axial directions, which places practical limitations on an ability to control the axial breakaway behavior of the propeller shaft in each of the opposing axial directions independently of each other.

It would therefore be desirable to produce a simplified propeller shaft assembly capable of controlling an axial fracture or buckling of the propeller shaft.

SUMMARY OF THE INVENTION

Compatible and attuned with the present invention, a propeller shaft assembly having an improved response to an axial compression load applied to the propeller shaft assembly has surprisingly been discovered.

In one embodiment of the invention, a propeller shaft assembly comprises a first rotary component having a first splined portion and a first engaging surface arranged transverse to a longitudinal axis of the first rotary component and spaced from the first splined portion and a second rotary component having a second splined portion configured to engage the first splined portion. The second splined portion defines a second engaging surface arranged transverse to the longitudinal axis of the first rotary component. A shear component is disposed between the first engaging surface of the first rotary component and the second engaging surface of the second rotary component. The shear component forms a crash feature of the propeller shaft assembly configured to shear at an edge of the second engaging surface when the first shear component is compressed between the first engaging surface and the second engaging surface.

BRIEF DESCRIPTION OF THE DRAWINGS

The above, as well as other objects and advantages of the invention, will become readily apparent to those skilled in the art from reading the following detailed description of a preferred embodiment of the invention when considered in the light of the accompanying drawings:

FIG. 1 is a top plan view of a propeller shaft assembly according to an embodiment of the invention;

FIG. 2 is a cross-sectional elevational view of the propeller shaft assembly as taken through section lines 2-2 of FIG. 1;

FIG. 3 is an enlarged fragmentary cross-sectional elevational view of a portion of the propeller shaft assembly bounded by circle 3 in FIG. 2;

FIG. 5 is an enlarged fragmentary cross-sectional elevational view of a portion of the propeller shaft assembly bounded by circle 5 in FIG. 2;

FIG. 6 is a fragmentary cross-sectional elevational view illustrating the propeller shaft assembly of FIG. 2 prior to a shearing of a shear component forming a crash feature of the propeller shaft assembly;

FIG. 7 is a fragmentary cross-sectional elevational view illustrating the propeller shaft assembly of FIG. 2 following the shearing of the shear component and a collapsing of the propeller shaft assembly.

DETAILED DESCRIPTION OF THE INVENTION

Figure 4:
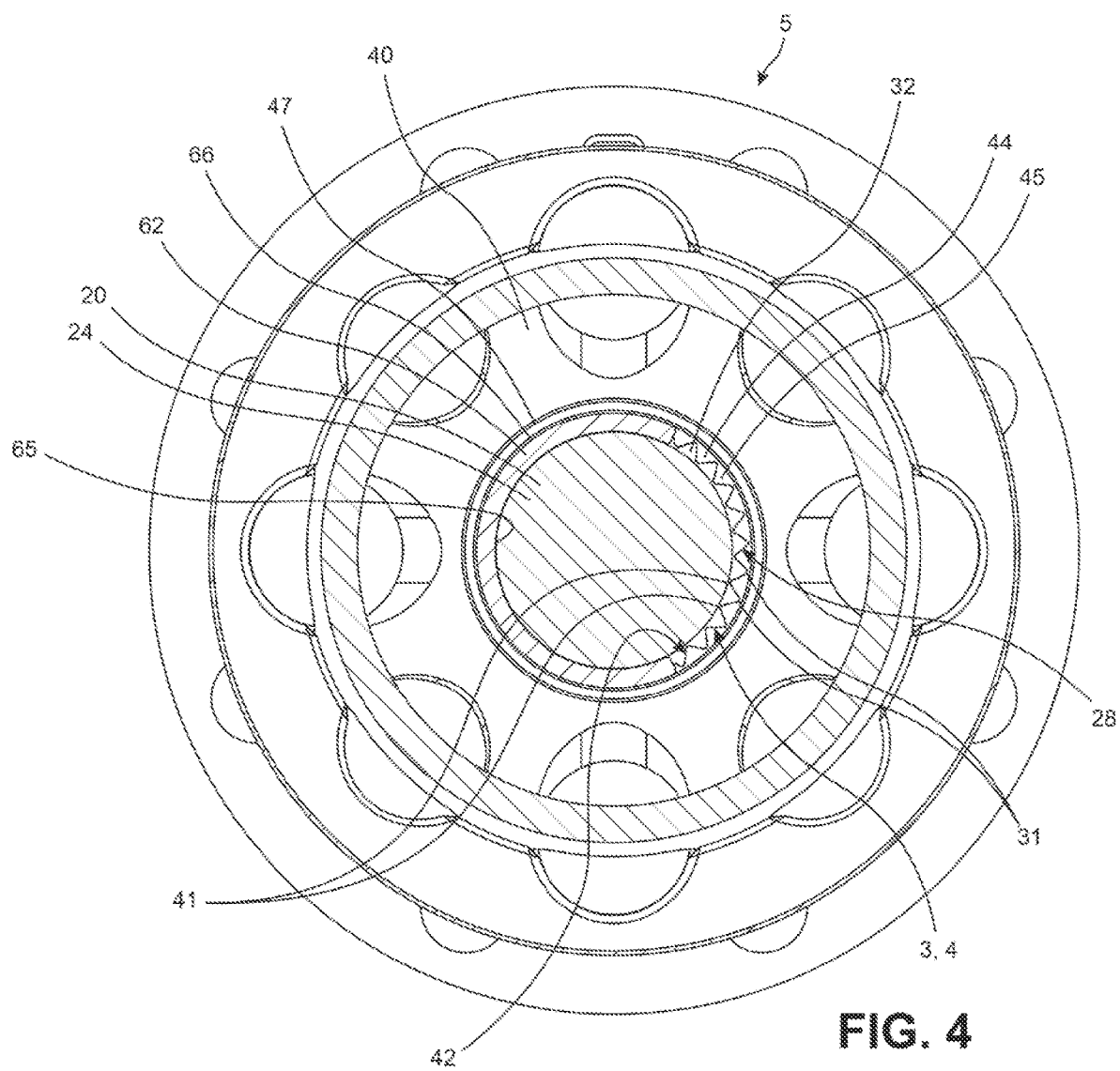
FIG. 4 is a cross-sectional elevational view of the propeller shaft assembly as taken through section lines 4-4 in FIG. 3.

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

The present invention generally relates to a propeller shaft assembly for use in a drive system of a motor vehicle, wherein the propeller shaft assembly includes one or more crash features for telescoping one component of the propeller shaft assembly relative to another component thereof. The telescoping of the independent components of the propeller shaft assembly aids in preventing the ingress of either of the components into an undesired portion of the motor vehicle, such as the engine, the vehicle battery, or the passenger compartment, as non-limiting examples.

The disclosed propeller shaft assembly may normally be configured for extension in a longitudinal direction of the motor vehicle, such as for transferring rotational motion between a front portion and a rear portion of the motor vehicle. The propeller shaft assembly may be configured for transferring rotational motion from a front mounted drive system of the motor vehicle to a set of rear wheels of the motor vehicle, as one non-limiting example. The propeller shaft assembly arranged in the longitudinal direction of the motor vehicle may be configured for telescoping following a head-on collision, a rear collision, or a combination thereof, as non-limiting examples. However, it should be appreciated by one skilled in the art that the disclosed propeller shaft assemblies and associated crash features may be adapted for use in any application wherein rotational motion is transferred between two rotary components potentially subjected to an axial load, regardless of the direction of orientation of the associated propeller shaft assembly. For example, the disclosed crash features may be adapted for jointing two components of a laterally extending axle or similar component of the motor vehicle for telescoping during a side collision, as desired, without necessarily departing from the scope of the present invention.

As disclosed throughout, the disclosed crash feature may be adapted for incorporation at the junction of any two portions or components of the propeller shaft assembly capable of sliding axially relative to each other. More specifically, the joint formed between the two components may include a cooperating spline and groove connection therebetween. As used herein, a spline and groove connection refers to a connection formed between an outer circumferential surface of a first rotary component and an inner circumferential surface of a second rotary component, wherein the inner circumferential surface and the outer circumferential surface include a series of interlocking splines and grooves capable of transferring rotational motion between the first and second rotary components while also allowing for relative axial motion between the first and second rotary components at the junction therebetween when subjected to a predetermined axial load (absent additional structure for restraining the axial motion therebetween, as explained hereinafter). Although generally described as axially or longitudinally extending, it should also be understood that the splines and grooves may include a slight helical bend or curve when extending axially or longitudinally to form a minor press fit between the cooperating splines and grooves. The helical curvature and press fit arrangement may maintain an axial position of each of the components relative to each other when subjected to typical axial loads experienced during use of the propeller shaft assembly, but the interference provided can be overcome to allow the cooperating structures to telescope relative to each other when a sufficient axial load is applied to one or both of the cooperating components.

The cooperating spline and groove connections may include splines and grooves having any desired interface, such as a corrugated interface including cooperating arcuate grooves and projections or a saw-tooth interface including cooperating triangular grooves and projections, as desired, so long as the splines and grooves extend a sufficient distance in the radial direction of the corresponding rotary component to ensure that torque is suitably transferred between the cooperating splines and grooves without risking deformation or failure of the associated splines and grooves. It should be understood by one skilled in the art that any pattern or spacing of the splines and grooves may be formed in either of the circumferential surfaces so long as the spline and grooves extend primarily in the axial direction of the associated first and second rotary components while also forming torque transferring contact between the first and second rotary components during a rotation of one of the rotary components relative to the other due to the interlocking configuration of the splines and grooves.

The crash feature of the propeller shaft assembly as disclosed herein may be adapted for incorporation at the junction of any two rotary components of the associated drive system and regardless of the type of joint formed at each of the opposing ends of the associated rotary components. For example, the first rotary component may include a first end including the joint with the crash feature and an oppositely arranged second end operatively coupled to a single axis rotary joint, a multi-axis rotary joint (CV joint, Cardan joint, etc.), a drive component of the drive system, or a driven component of the drive system, as non-limiting examples. The second rotary component may similarly include a first end including the joint with the crash feature and an oppositely arranged second end operatively coupled to one of the aforementioned features, as desired.

For example, FIGS. 1-5 illustrate a propeller shaft assembly 1 including a pair of spline and groove connections, wherein each of the spline and groove connections includes a collapsible crash feature as described hereinafter. The illustrated propeller shaft assembly 1 includes a first CV joint 5 having a spline and groove connection with a first shaft component 20, a second shaft component 120 having a spline and groove connection with the first shaft component 20, and a second CV joint 105 operatively coupled to the second shaft component 120. In the illustrated embodiment, the first shaft component 20 is further supported by a center bearing assembly 130.

As best shown in FIG. 3, the first CV joint 5 includes an inner race 40, a ball cage 56 having a plurality of balls 57, and an outer race 58. The outer race 58 of the first CV joint 5 is coupled to a first shaft tube 70 provided as an open ended cylinder having a hollow interior 72. The outer race 58 may be welded to the first shaft tube 70, as desired. An end of the first shaft tube 70 disposed opposite the outer race 58 may be operatively coupled to a drive mechanism (not shown) or a driven mechanism (not shown) of the propeller shaft assembly 1, as desired. A grease cover 74 extends across an inner diameter of the outer race 58 and provides a barrier for preventing the undesired transfer of grease or debris between the first CV joint 5 and the hollow interior 72 of the first shaft tube 70.

The first shaft component 20 includes a shaft body 21, a second shaft tube 22, and a collar 23. The shaft body 21 is cylindrical in shape and includes a small diameter portion 24 and a large diameter portion 25. The small diameter portion 24 of the shaft body 21 is received within the inner race 40 of the first CV joint 5 and forms a spline and groove connection therewith, as described in greater detail hereinafter when describing the collapsible crash feature formed at the junction between the first shaft component 20 and the first CV joint 5. The second shaft tube 22 is a hollow and open ended cylinder securely coupled to the large diameter portion 25 of the shaft body 21 by any suitable coupling method, including welding. An end of the second shaft tube 22 opposite the shaft body 21 is securely coupled to the collar 23 by any suitable coupling method, including welding. The collar 23 is substantially cylindrical in shape and receives the second shaft component 120 therein.

The second shaft component 120 forms a shaft body 121 having a first end received within the collar 23 of the first shaft component 20 and an opposing second end operatively engaging the second CV joint 105. The second shaft component 120 forms a spline and groove connection with the collar 23 as explained in greater detail hereinafter when describing the collapsible crash feature formed at the junction between the first shaft component 20 and the second shaft component 120.

The center bearing assembly 130 may be optionally utilized to support the propeller shaft assembly 1 intermediate a drive mechanism of the associated drive system and a set of wheels of the motor vehicle spaced from the drive mechanism with respect to the longitudinal direction of the motor vehicle, as desired. The center bearing assembly 130 includes an inner ring 131, an outer ring 132 coupled to an inner surface of a first cylindrical sleeve 136, and a plurality of balls 133 disposed between the inner ring 131 and the outer ring 132 for allowing rotation of the inner ring 131 relative to the outer ring 132. The inner ring 131 is coupled to an outer circumferential surface 29 of the first shaft component 20 adjacent a transition from the small diameter portion 24 to the large diameter portion 25 of the shaft body 21. The first cylindrical sleeve 136 is coupled to an annually extending center bearing isolator 137. The center bearing isolator 137 extends radially between the first cylindrical sleeve 136 and a radially outwardly disposed second cylindrical sleeve 138. The second cylindrical sleeve 138 may be bolted or otherwise securely coupled to a frame of the vehicle.

The center bearing isolator 137 may be formed from an elastomeric material capable of fracturing when subjected to an axial load on the propeller shaft assembly 1 exceeding a certain predetermined value. The center bearing isolator 137 may for example be formed from rubber or a similar elastomeric material configured to shear in response to the predetermined axial load. The center bearing isolator 137 is shown as having a substantially S-shaped cross-section, but other shapes may be used without departing from the scope of the present invention.

Referring now to FIG. 3, the small diameter portion 24 of the first shaft component 20 includes an annually extending projection 26 extending radially outwardly from the outer circumferential surface 29 of the first shaft component 20. The projection 26 forms a first engaging surface 27 arranged transversely to a longitudinal axis of the first shaft component 20. In the illustrated embodiment, the first engaging surface 27 is formed substantially perpendicular to the longitudinal direction of the first shaft component 20. In other embodiments, the first engaging surface 27 may be inclined with respect to the longitudinal axis of the first shaft component 20, as desired.

The splined portion 28 of the first shaft component 20 projects from the outer circumferential surface 29 thereof and is spaced from the projection 26 with respect to the longitudinal direction of the first shaft component 20. The splined portion 28 is configured to cooperate with a splined portion 42 forming an inner circumferential surface of the inner race 40 when the first shaft component 20 is operatively coupled to the first CV joint 5.

As best shown in FIG. 4, the splined portion 28 of the first shaft component 20 includes a plurality of splines 31 projecting radially outwardly from the outer circumferential surface 29 of the first shaft component 20. Each of the splines 31 is shown as having a substantially triangular cross-sectional shape to cause the splined portion 28 to have a circumferentially extending saw-tooth profile with alternating triangular peaks and valleys. The substantially triangular cross-sectional shape may include each of the splines 31 having involute lateral surfaces to cause each of the splines 31 to include a profile similar to the profile of a tooth of an involute gear. The involute shape may further include a distal surface of each of the splines 31 arranged substantially parallel to the circumferential direction of the first shaft component 20, as desired.

The splined portion 42 of the inner race 40 includes a plurality of radially inwardly projecting splines 41, wherein each of the splines 41 has a triangular cross-sectional shape corresponding to the triangular cross-sectional shape of the splines 31 to cause the splined portion 42 to have a circumferentially extending saw-tooth profile with alternating triangular peaks and valleys. The splines 41 may include any of the cross-sectional shapes contemplated hereinabove with respect to the splines 31, as desired. The peaks of the splines 31 of the first shaft component 20 accordingly nest within the valleys of the splines 41 of the inner race 40, and vice versa, to cause a shape of an interface between the cooperating splines 31, 41 to substantially correspond to the shape of the profile of each set of splines 31, 41 individually. In other words, a substantially saw-toothed seam or joint 3 is formed at the intersection between the cooperating splined portions 28, 42 about a circumference of the splined and groove connection due to the substantially similar sizes and shapes of the nesting splines 31, 41. It should be understood, however, that the joint 3 may include minor gaps or clearances thereabout based on the shape of each of the splines 31, 41. For example, if splines 31, 41 having an involute profile are used, the clearances may be most prevalent adjacent the peaks and valleys of the splines 31, 41.

A first end surface 44 of the splined portion 42 of the inner race 40 faces towards the first engaging surface 27 formed by the projection 26 and forms a second engaging surface 45. A first end surface 32 of the splined portion 28 of the first shaft component 20 may be substantially aligned with the first end surface 44 of the splined portion 42 of the inner race 40 with respect to the longitudinal direction of the first shaft component 20. The end surfaces 32, 44 are illustrated as perpendicular to the longitudinal axis of the first shaft component 20 to form a co-planar surface, but the end surfaces 32, 44 may alternatively be arranged to be inclined relative to the longitudinal axis of the first shaft component 20. If inclined, each of the end surfaces 32, 44 may be inclined to be arranged parallel to each other about a circumference of the joint 3 while the end surfaces 32, 44 incline towards the first engaging surface 27. In other embodiments, each of the end surfaces 32, 44 may include different inclinations relative to the longitudinal axis of the first shaft component 20, including each of the end surfaces 32, 44 having opposing inclinations relative to each other.

An annular retaining lip 47 projects axially from the inner race 40 at a position immediately radially outward of the valleys formed by the splines 41 of the inner race 40. The annular retaining lip 47 projects axially in a direction towards the first engaging surface 27 and extends beyond both of the end surfaces 32, 44. The first engaging surface 27, the first end surface 32 of the splined portion 28, and a portion of the outer circumferential surface 29 of the first shaft component 20 disposed intermediate the first engaging surface 27 and the first end surface 32 cooperate to form a first retention groove 60. The first retention groove 60 is configured to receive a first shear component 62 therein.

The first shear component 62 may be in the form of an annularly extending ring or clip extending circumferentially through greater than 180 degrees of angular displacement to form a substantially C-shaped structure (FIG. 4). The C-shaped configuration of the first shear component 62 prevents undesired removal or discharge of the first shear component 62 from the first retention groove 60 in a radially outward direction. The C-shaped configuration of the first shear component 62 is further configured to allow for the first shear component 62 to be independently formed and subsequently received over the first shaft component 20 and positioned within the first retention groove 60. Specifically, the slot or opening formed between the opposing circumferential ends of the first shear component 62 allows for the first shear component 62 to be flexed in a manner for expanding a passage defined by an inner circumferential surface 65 of the first shear component 62 to more easily allow the first shaft component 20 to be received therein while also allowing for further expansion of the passage when the first shear component 62 passes by portions of the first shaft component 20 having an increased diameter, such as the projection 26 or the splined portion 28 thereof.

The first shear component 62 may be formed from a material capable of failing when subjected to an axial load on the propeller shaft assembly 1 exceeding a certain predetermined value depending upon the radial thickness and the axial length of the first shear component 62. The material used to form the first shear component is accordingly selected to include a predetermined shear strength in order to predict the axial load at which the first shear component 62 will fail. The material used to form the first shear component 62 is also preferably elastically deformable to the extent that the C-shaped first shear component 62 must be flexed for reception over the first shaft component 20 as described above.

In some embodiments, the first shear component 62 may be formed from a polymeric material such as a thermoplastic polymer or a thermosetting polymer. The first shear component 62 may be formed from a composite material including one or more polymers and one or more filler materials, including inorganic filler materials. The composite material may be a moldable glass-filled polymer comprising a plurality of glass-fibers disposed within a matrix of a polymeric material. In one embodiment, the first shear component 62 may be formed from a composite material comprising nylon and a glass-fiber filler. The first shear component 62 may preferably be formed in a single injection molding operation wherein the resulting first shear component 62 maintains a desired shear strength following the molding process. The material selected for forming the first shear component 62 is also preferably capable of failing due to shearing in a relatively predictable manner.

In other embodiments, the first shear component 62 may alternatively be formed from a substantially soft metallic material having the characteristics described hereinabove. The first shear component 62 may be formed from a relatively soft aluminum alloy or a relatively soft steel, as non-limiting examples.

The first shear component 62 may include a substantially rectangular cross-sectional shape as best shown with renewed reference to FIG. 3. However, in other embodiments, one or both of the axial end surfaces of the first shear component 62 may be inclined to match an incline of any one of the first end surface 32 of the splined portion 28, the first end surface 44 of the splined portion 42, or the end surface of the projection 26 forming the first engaging surface 27, as desired. In the illustrated embodiment, a first axial end surface 63 of the first shear component 62 is arranged perpendicular to the longitudinal axis of the first shaft component 20 while abutting the first engaging surface 27 formed by the projection 26 while a second axial end surface 64 of the first shear component 62 is arranged perpendicular to the longitudinal axis of the first shaft component 62 while abutting each of the first end surface 32 of the splined portion 28 and the first end surface 44 of the splined portion 42 forming the second engaging surface 45. The first shear component 62 is accordingly constrained axially within the first retention groove 60 when in the position shown in FIGS. 3 and 4, hence the first shaft component 20 is similarly incapable of axial motion relative to the inner race 40.

The placement of the first shear component 62 within the first retention groove 60 also causes the annular retaining lip 47 to extend axially over at least a portion of an axial length of the first shear component 62 when the splined portions 28, 44 are axially engaged in the position of FIG. 3, hence the annular retaining lip 47 further prevents a radial outward removal of the first shear component 62 from the first retention groove 60 when installed therein. Similarly, the inner circumferential surface 65 of the first shear component 62 rests on the outer circumferential surface 29 of the first shaft component 20 within the first retention groove 60 to restrict radial inward motion of the first shear component 62 relative to the first shaft component 20. The retaining lip 47 accordingly forms a radial outward stopping surface for abutting and constraining the outer circumferential surface 66 of the first shear component 62 while the outer circumferential surface 29 of the first retention groove 60 provides a radial inward stopping surface for abutting and constraining the inner circumferential surface 65 of the first shear component 62.

Referring again to FIG. 4, the first shear component 62 may include a radial thickness substantially equal to or greater than a height of each of the splines 31, 41 taken with respect to the radial direction of the first shaft component 20. In other words, a radial distance between the inner circumferential surface 65 and an outer circumferential surface 66 of the first shear component 62 may be substantially equal to or greater than a radial distance between the valley and the peak of each of the splines 31, 41. In the illustrated embodiment, the joint 3 formed between the splined portions 28, 42 is maintained radially between the inner circumferential surface 65 and the outer circumferential surface 66 of the first shear component 62 while the second end surface 64 of the first shear component 62 faces towards and abuts the joint 3. Specifically, the second end surface 64 of the first shear component 62 faces towards and abuts the first end surface 44 of the splined portion 42 along an edge 4 formed between the radially extending first end surface 44 and a longitudinally extending surface of the splined portion 42 engaging the splined portion 28. In the illustrated embodiment, an entirety of the second end surface 64 of the first shear component 62 is aligned with or overlays the edge 4 of the splined portion 42 about a periphery of the first shear component 62.

However, in some alternative embodiments, only a portion of the second end surface 64 of the first shear component 62 is caused to face directly towards and extend radially outwardly beyond the edge 4 of the splined portion 42. Such a circumstance may occur if the first shear component 62 is formed to include a variable thickness about a periphery of the C-shaped structure thereof wherein at least a portion of the thickness of the first shear component 62 does not exceed the height of the splines 41 forming the splined portion 42. As such, any portion of the first shear component 62 extending radially outwardly beyond the edge 4 will act to provide the interference for preventing axial motion of the first shaft component 20, hence satisfactory results may be achieved wherein only a portion of the circumferential length of the first shear component 62 extends across the edge 4.

The outer circumferential surface 29 of the first shaft component 20 further includes a second retention groove 80 formed opposite the first retention groove 60 with respect to the inner race 40. The second retention groove 80 includes a substantially rectangular cross-sectional shape including a radially extending surface formed by the cooperation of a second end surface 46 of the splined portion 42 of the inner race 40 and a second end surface 36 of the splined portion 28 of the first shaft component 20. An axially extending lip 49 of the inner race 40 extends axially over the second retention groove 80.

The second retention groove 80 is configured to receive a first retention clip 85 therein. The first retention clip 85 may be a substantially C-shaped structure configured to elastically deform to a shape allowing for the first retention clip 85 to be received within the second retention groove 80 while having a smaller outer diameter than an inner diameter of the axially extending lip 49. The first retention clip 85 then elastically expands back to its original shape such that the first retention clip 85 extends across the joint 3 formed between the splined portions 28, 42. The first retention clip 85 may be formed to include a varying radius of curvature about a circumferential direction thereof in a manner allowing for the first retention clip to be deformed to a substantially constant radius of curvature (circular shape) for conforming to the annularly extending second retention groove 80 before returning to the shape wherein portions of the first retention clip 85 extend beyond the joint 3. The first retention clip 85 accordingly forms an interference fit preventing undesired axial separation of the first shaft component 20 relative to the inner race 40, thereby preventing relative motion between the first shaft component 20 and the inner race 40 in a direction opposite to that of the first shear component 62. The first retention clip 85 accordingly does not prevent motion of the first shaft component 20 towards the first shaft tube 70 coupled to the outer race 58 of the first CV joint 5.

Referring now to FIG. 5, a crash feature associated with the splined connection between the second shaft component 120 and the collar 23 coupled to the second shaft tube 22 of the first shaft component 20 is shown, wherein the crash feature includes substantially the same elements and operates in substantially the same manner as the crash feature illustrated in FIGS. 3 and 4.

The second shaft component 120 includes a splined portion 122 engaging a splined portion 152 of the collar 23. The splined portion 122 includes a first end surface 123 and a longitudinally extending outer surface 125. The outer surface 125 is splined to include a corrugated profile including a repeating pattern of peaks and valleys, wherein the peaks and valleys may be arcuate in shape or triangular in shape (as depicted in FIG. 4). The first end surface 123 of the splined portion 122 is arranged transversely to the longitudinal axis of the second shaft component 120. In the illustrated embodiment, the first end surface 123 is inclined towards an opposing second end surface of the splined portion 122 as the first end surface 123 projects radially outwardly.

An annularly extending projection 142 is spaced from the splined portion 122 and defines a first engaging surface 144 arranged transversely to the longitudinal axis of the second shaft component 120. The first engaging surface 144 is illustrated as being inclined away from the splined portion 122 in FIG. 5, but in other embodiments the first engaging surface 144 may be arranged perpendicular to the longitudinal direction of the second shaft component 120, as desired.

The second shaft component 120 further includes a first retention groove 160 and a second retention groove 180. The first retention groove 160 is formed by the cooperation of the first end surface 123 of the splined portion 122, the first engaging surface 144 of the projection 142, and a portion of an outer circumferential surface 128 of the second shaft component intermediate the first end surface 123 and the first engaging surface 144. The second retention groove 180 includes a substantially rectangular cross-sectional shape and is defined partially by the second end surface of the splined portion 122.

The splined portion 152 of the collar 23 includes a first end surface 153 and a longitudinally extending inner surface 155. The inner surface 155 is splined to include a corrugated profile corresponding to and nesting within the corrugated profile of the inner surface 125 of the splined portion 122. An edge 156 formed between the first end surface 153 and the inner surface 155 accordingly includes the same corrugated profile. The first end surface 153 is arranged transversely to the longitudinal axis of the second shaft component 120. In the illustrated embodiment, the first end surface 153 is inclined towards a second end surface of the splined portion 152 as the first end surface 153 projects radially inwardly. The first end surface 153 of the splined portion 152 forms a second engaging surface 158.

The collar 23 additionally includes an axially extending lip 159 extending axially from a position radially outward of the first end surface 153 of the splined portion 152. The axially extending lip 159 extends axially over the first retention groove 160 formed in the second shaft component 120.

The first retention groove 160 is configured to receive a second shear component 162 therein. The second shear component 162 includes substantially the same form and configuration as the first shear component 62 and may be formed from any of the materials described as suitable for forming the first shear component 62. The second shear component 162 extends axially between the first end surface 123 of the splined portion 122 and the first engaging surface 144 formed by the projection 142. The second shear component 162 includes a thickness substantially equal to or slightly smaller than a radial distance formed between the portion of the outer surface 128 of the second shaft component 120 defining the first retention groove 160 and an inner surface of the axially extending lip 159.

The second retention groove 180 is configured to receive a second retention clip 185 therein. The second retention clip 185 operates in similar fashion to the first retention clip 85 described hereinabove. Specifically, the second retention clip 185 may be a substantially C-shaped structure configured to elastically deform to a shape allowing for the second retention clip 185 to be received within the second retention groove 180. The second retention clip 185 then elastically expands back to its original shape such that the second retention clip 185 provides interference at a joint formed between the splined portions 122, 152, thereby preventing a separating motion between the second shaft component 120 and the collar 23.

The first shear component 62 and the second shear component 162 are formed to shear and therefore fail when subjected to two different axial loads in order to control an order of collapse of the propeller shaft assembly 1. For example, the first shear component 62 may be configured to fail at a first axial load less than a second axial load at which the second shear component 162 is configured to fail, thereby causing the first shaft component 20, the second shaft component 120, and the second CV joint 105 to collapse towards the first shaft tube 70 due to the failure of the first shear component 62 prior to the collapsing of the second shaft component 120 and the second CV joint 105 towards the second shaft tube 22 due to the subsequent failure of the second shear component 162. Alternatively, the second shear component 162 may be configured to fail at a first axial load less than a second axial load at which the first shear component 62 is configured to fail, thereby reversing the order of failure of the first and second shear components 62, 162.

The first shear component 62 and the second shear component 162 may be configured to fail at different axial loads by varying any of a variety of different characteristics between the two shear components 62, 162. For example, one or more of a radial thickness, an axial length, a circumferential angular displacement, or a material composition may be varied between the shear components 62, 162. If a composite material is used, the shear components 62, 162 may be comprised of similar materials with differing distributions of the corresponding materials, such as varying a percentage by volume of a filler material added to a polymeric material, as one non-limiting example. The shear components 62, 162 may alternatively be formed from two distinct materials, as desired.

In use, the propeller shaft assembly 1 may be subjected to an axial load causing an axial distance between the first CV joint 5 and the second CV joint 105 to be decreased to cause one of the shear components 62, 162 to fail prior to the subsequent failure of the other of the shear components 62, 162. For example, FIGS. 6 and 7 illustrate a failure of the first shear component 62 causing a telescoping of the small diameter portion 24 of the first shaft component 20 into the hollow interior 72 of the first shaft tube 70 coupled to the outer race 58 of the first CV joint 5. The axial load applied to the propeller shaft assembly 1 causes the first shear component 62 to be compressed between the opposing first and second engaging surfaces 27, 45 until a predetermined axial load is applied to the first shear component 62. The predetermined axial load leads to a shearing of the first shear component 62 at the edge 4 formed by the splined portion 44 of the inner race 40. Specifically, the first shear component 62 is sheared to be separated into a radially inward portion 67 and a radially outward portion 68 separated by a cut having the shape of the profile of the edge 4 of the splined portion 42.

The shearing of the first shear component 62 allows for the splined portion 28 of the first shaft component 20 to slide axially along the splined portion 42 of the inner race 40 while the radially inward portion 67 of the first shear component 62 slides along the inner surface 43 of the splined portion 42 while maintained between the annular projection 26 and the first end surface 32 of the splined portion 28. The annular projection 26 includes a maximum outer diameter less than a minimum inner diameter of the splined portion 42 of the inner race 40 to allow for the annular projection 26 to be received within the splined portion 42 without causing obstruction therebetween. The radially outward portion 68 of the first shear component 62 may be maintained along the first end surface 44 of the splined portion during the telescoping of the first shaft component 20 into the hollow interior 72 of the first shaft tube 70. An end of the small diameter portion 24 of the first shaft component 20 also strikes the grease cover 74 to separate the grease cover 74 from the outer race 58. The small diameter portion 24 of the first shaft component 20 and the grease cover 74 each accordingly includes an outer diameter less than an inner diameter of the first shaft tube 70 to allow for the telescoping in the manner disclosed.

The telescoping of the first shaft component 20 within the inner race 40 simultaneously causes the portions of the center bearing assembly 130 disposed radially inwardly of the center bearing isolator 137 to move in unison with the remainder of the first shaft component 20. The movement of the a first cylindrical sleeve 136 relative to the second cylindrical sleeve 138 causes the center bearing isolator 137 to begin to deform until the center bearing isolator 137 fails by shearing. The shearing of the center bearing isolator 137 further allows for unrestricted movement of the first shaft component 20 towards the propeller shaft tube 70. The center bearing isolator 137 may be configured to shear at an axial load less than the axial load causing the shearing of either of the disclosed shear components 62, 162.

The second shear component 162 fails in substantially the same manner as the first shear component 62. The second shear component 162 is compressed between the first engaging surface 144 formed by the projection 142 and the second engaging surface 158 formed by the first end surface 153 of the splined portion 152 of the collar 23 until a predetermined axial load is reached. The predetermined axial load causes the second shear component 162 to shear into two separate portions as described above with the two separate portions sheared to include a profile shape corresponding to the profile shape of the edge 156 of the splined portion 152 of the collar 23. The radially inward portion of the second shear component 162 slides along the inner surface 155 of the splined portion 152 as the second shaft component 120 telescopes into the hollow interior of the second shaft tube 22. The radially outward portion of the second shear component 162 may be maintained in contact with the first end surface 153 of the splined portion 152 while the second shaft component 120 slides relative to the collar 23.

As explained hereinabove, the shear components 62, 162 are configured to fail by shearing in a desired order to cause the propeller shaft assembly 1 to collapse in a prescribed manner preventing the ingress of any of the shaft components 20, 120 into an undesired portion of the vehicle.

The disclosed crash features provide numerous advantageous features. The use of the C-shaped structure beneficially allows for each of the shear components 62, 162 to be formed independently of the remainder of the propeller shaft assembly 1 before being subsequently received over the corresponding shaft component 20, 120 due to the manner in which the shear components 62, 162 can flex outwardly to accommodate reception of the larger diameter shaft components 20, 120. Additionally, the manner in which each of the shear components 62, 162 first encounters a corrugated edge 4, 156 of a splined portion 42, 152 when compressed axially results in a relatively longer shearing edge encountering each of the shear components 62, 162 in comparison to an edge having a constant radius of curvature. For example, the saw-toothed profile of each of the disclosed edges 4, 156 forms a greater length of a shearing edge in comparison to a shearing edge formed by a circular edge devoid of such corrugations. The greater length of the shearing edge formed by the corrugated edge 4, 156 provides the benefit of distributing the stresses during the shearing process in order to ensure that each of the shear components 62, 162 fails in a controlled and predictable manner.

The manner in which each of the crash features includes the telescoping of a pair of splined surfaces relative to each other also significantly reduces the necessary diameter of several components forming the propeller shaft assembly 1. For example, the telescoping of the relatively narrow small diameter portion 24 of the first shaft component 20 into the hollow interior 72 of the first shaft tube 70 allows for the first shaft tube 70 to be provided with a minimized inner diameter suitable for receiving the first shaft component 20 therein. Additionally, with renewed reference to FIGS. 6 and 7, the first shaft component 20 may commonly be arranged at an angle with respect to the first shaft tube 70 prior to failure of the first shear component 62 due to the manner in which the first CV joint 5 is capable of transferring rotational motion between rotary components having non-parallel rotational axes. The telescoping of the relatively narrow small diameter portion 24 of the first shaft component 20 further allows for the first shaft component 20 to be displaced at a greater angle relative to the first shaft tube 70 while still telescoping therein.

With specific reference to the configuration illustrated in FIG. 5, it may also be beneficial to include the first end surface 153 of the splined portion 152 defining the edge 156 inclined at an angle relative to a facing end surface of the second shear component 162 as such a configuration alters a manner in which the shearing of the second shearing component 162 occurs. The angle of inclination may be formed by inclining the first end surface 153 or by forming the facing end surface of the second shear component 162 at an incline, as desired. For example, the inclination of the first end surface 153 relative to the facing end surface of the second shear surface 162 causes the edge 156 to continuously vary in both a distance from the axis of rotation of the first shaft component 20 and an axial distance from the first engaging surface 144 of the projection 142 due to the corrugated profile of the edge 156. The corrugated profile accordingly causes the second shear component 162 to first encounter a plurality of corner portions of the edge 156 formed at each of the valleys or each of the peaks (depending on the direction of relative inclination) formed between adjacent ones of the inwardly projecting splines, thereby distributing the axial load to these circumferentially spaced corner portions exclusively upon the initial compression of the second shear component 162. The continued axial motion of the second shear component 162 accordingly causes the shearing to proceed from a plurality of circumferentially spaced points to a plurality of circumferentially spaced triangular shears, thereby continuously increasing the length of the shearing surface encountering the second shear component 162 as the telescoping continues in the axial direction. The use of an inclined engaging surface accordingly provides for a controlled shearing of the corresponding shear component due to the manner in which the shearing surface continuously increases in order to distribute the axial load to a greater area of contact between the shear component and the inclined engaging surface. The initial contact with a corner portion of the edge 156 also aids in first penetrating the second shear component 162 due to the increased stresses at these points upon initial compression of the second shear component 162.

Figure 8:
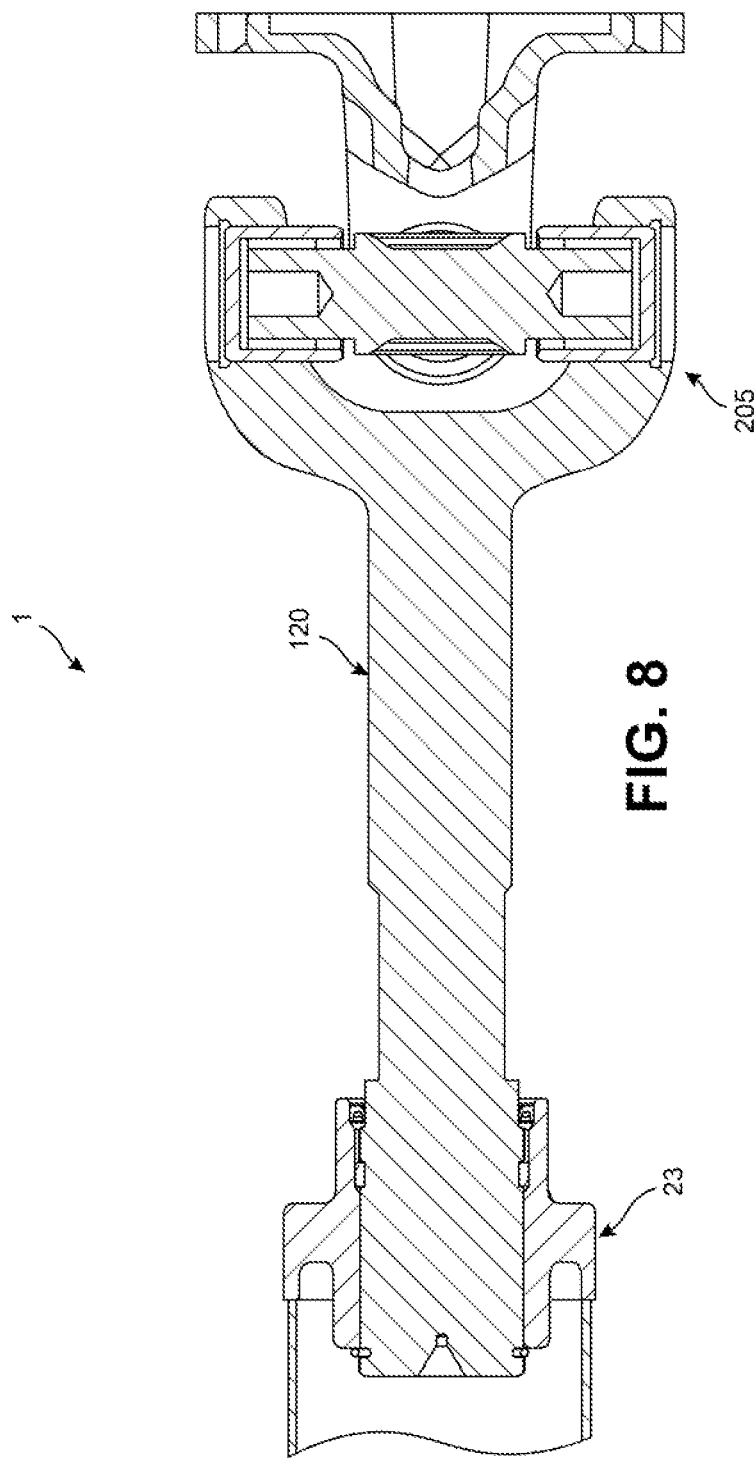
FIG. 8 is a fragmentary cross-sectional elevational view of a propeller shaft assembly having a Cardan joint operatively coupled to the propeller shaft assembly.

As explained throughout, any type of joint structure may be coupled to either of the shaft components 20, 120 while remaining within the scope of the present invention. For example, FIG. 8 illustrates an alternative embodiment of the second shaft component 120 wherein an end of the second shaft component 120 is operatively engaged with a Cardan joint 205 in place of the CV joint 105 as illustrated in FIGS. 1 and 2. The disclosed crash features may be adapted for use at any splined connection of the propeller shaft assembly 1 while remaining within the scope of the present invention.

The use of each of the first shear component 62 and the first retention clip 85 in restricting the axial motion of the first shaft component 20 in two opposing directions also provides benefits in comparison to the use of a single component for restricting the axial motion. For example, the shear component 62 may be selected specifically for encountering the expected loads experienced by the first shaft component 20 in the single axial direction because the first shear component 62 is not required to perform a dual function of restricting motion in two different and opposing directions. As such, the propeller shaft assembly 1 is able to be configured to fail in response to different axial loads in the two different directions, wherein the two different directions may not be expected to experience loads having the same magnitude or frequency.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A propeller shaft assembly comprising:
a first rotary component having a first splined portion and a first engaging surface arranged transverse to a longitudinal axis of the first rotary component and spaced from the first splined portion;
a second rotary component having a second splined portion configured to engage the first splined portion, an end surface of the second splined portion defining a second engaging surface arranged transverse to the longitudinal axis of the first rotary component; and
a first shear component disposed between the first engaging surface of the first rotary component and the second engaging surface of the second rotary component with respect to a longitudinal direction of the first rotary component, wherein the first shear component extends circumferentially around at least a portion of an outer surface of the first rotary component, the first shear component configured to shear at an edge of the second engaging surface when the first shear component is compressed between the first engaging surface and the second engaging surface, wherein the edge is formed at an intersection of the end surface of the second splined portion forming the second engaging surface and an inner surface of the second splined portion, wherein the edge has a circumferentially extending corrugated profile shape corresponding to a circumferentially extending corrugated profile shape of the inner surface of the second splined portion.

2. The propeller shaft assembly of claim 1, wherein the edge of the second engaging surface includes a circumferentially extending saw-toothed profile shape.

3. The propeller shaft assembly of claim 1, wherein the second engaging surface is inclined relative to the longitudinal axis of the first rotary component, wherein an angle of inclination of the second engaging surface relative to the longitudinal axis of the first rotary component is greater than 0 degrees and less than 90 degrees.

4. The propeller shaft assembly of claim 1, wherein the second engaging surface is inclined relative to an end surface of the first shear component, wherein an angle of inclination of the second engaging surface relative to the end surface of the first shear component is greater than 0 degrees and less than 90 degrees.

5. The propeller shaft assembly of claim 1, wherein the first engaging surface is defined by an end surface of a projection projecting from an outer surface of the first rotary component.

6. The propeller shaft assembly of claim 1, wherein the second rotary component includes a retaining lip projecting from the second engaging surface of the second splined portion, the retaining lip projecting in the longitudinal direction of the first rotary component.

7. The propeller shaft assembly of claim 1, wherein the second rotary component is coupled to a first shaft tube having a hollow interior, wherein the first rotary component is configured to telescope into the hollow interior of the first shaft tube following a shearing of the first shear component.

8. The propeller shaft assembly of claim 1, wherein the first splined portion extends longitudinally from a first end to a second end, wherein the first end of the first splined portion is disposed adjacent the first shear component and the first rotary component includes a groove formed adjacent the second end of the first splined portion, wherein the groove receives a retention clip therein, wherein at least a portion of the retention clip extends across a joint formed between the first splined portion and the second splined portion.

9. The propeller shaft assembly of claim 8, wherein the first shear component restricts motion of the first rotary component in a first direction relative to the second rotary component and wherein the retention clip restricts motion of the first rotary component relative to the second rotary component in a second direction opposite the first direction.

10. The propeller shaft assembly of claim 1, wherein the second rotary component is an inner race of a constant velocity joint.

11. The propeller shaft assembly of claim 1, wherein a first end of the first rotary component includes the splined portion thereof, and wherein a second end of the first rotary component is coupled to one of a constant velocity joint or a Cardan joint.

12. The propeller shaft assembly of claim 1, wherein the first shear component has a substantially C-shaped cross-sectional shape.

13. The propeller shaft assembly of claim 12, wherein the first shear component is configured to elastically flex to receive the first shaft component.

14. The propeller shaft assembly of claim 13, wherein the first shear component is formed from a polymeric material.

15. The propeller shaft assembly of claim 14, wherein the first shear component is formed from a composite material including a polymeric material and an inorganic filler material.

16. A propeller shaft assembly comprising:
a first rotary component comprising a first shaft component and a second shaft component, the first shaft component extending from a first end to a second end, the first shaft component including a first splined portion and a first engaging surface disposed adjacent the first end thereof, the first engaging surface arranged transverse to a longitudinal axis of the first rotary component and spaced apart from the first splined portion, the first shaft component further including a second splined portion disposed adjacent the second end thereof, the second splined portion defining a second engaging surface arranged transverse to the longitudinal axis of the first rotary component, the second shaft component including a third splined portion configured to engage the second splined portion and a third engaging surface arranged transverse to the longitudinal axis of the first rotary component and spaced apart from the third splined portion;
a second rotary component having a fourth splined portion configured to engage the first splined portion, the fourth splined portion defining a fourth engaging surface arranged transverse to the longitudinal axis of the first rotary component;
a first shear component disposed between the first engaging surface of the first shaft component and the fourth engaging surface of the second rotary component, the first shear component configured to shear at an edge of the fourth engaging surface when the first shear component is compressed between the first engaging surface and the fourth engaging surface; and
a second shear component disposed between the second engaging surface of the first shaft component and the third engaging surface of the second shaft component, the second shear component configured to shear at an edge of the fourth engaging surface when the second shear component is compressed between the first engaging surface and the fourth engaging surface.

17. The propeller shaft assembly of claim 16, wherein the first shear component is configured to shear at a first predetermined axial load and the second shear component is configured to shear at a second predetermined axial load different from the first predetermined axial load.

18. The propeller shaft assembly of claim 16, wherein the first splined portion extends longitudinally from a first end to a second end, wherein the first end of the first splined portion is disposed adjacent the first shear component and the first shaft component includes a first groove formed adjacent the second end of the first splined portion, wherein the first groove receives a first retention clip therein, wherein at least a portion of the first retention clip extends across a joint formed between the first splined portion and the fourth splined portion, and wherein the third splined portion extends longitudinally from a first end to a second end, wherein the first end of the third splined portion is disposed adjacent the second shear component and the second rotary component includes a second groove formed adjacent the second end of the third splined portion, wherein the second groove receives a second retention clip therein, wherein at least a portion of the second retention clip extends across a joint formed between the second splined portion and the third splined portion.

19. The propeller shaft assembly of claim 18, wherein the first shear component restricts motion of the first shaft component relative to the second rotary component in a first direction and the first retention clip restricts motion of the first shaft component relative to the second rotary component in a second direction opposite the first direction, and wherein the second shear component restricts motion of the second shaft component relative to the first shaft component in the first direction and the second retention clip restricts motion of the second shaft component relative to the first shaft component in the second direction.

\* \* \* \* \*